US012518715B2

(12) United States Patent
Whitten

(10) Patent No.: US 12,518,715 B2
(45) Date of Patent: Jan. 6, 2026

(54) CONTENTIONLESS LEVEL-SHIFTER FOR DRIVING PIXELS OF A DISPLAY

(71) Applicant: Snap Inc., Santa Monica, CA (US)

(72) Inventor: Trent D. Whitten, Portland, OR (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/408,803

(22) Filed: Jan. 10, 2024

(65) Prior Publication Data

US 2024/0233673 A1 Jul. 11, 2024

Related U.S. Application Data

(60) Provisional application No. 63/479,318, filed on Jan. 10, 2023.

(51) Int. Cl.
*G09G 3/36* (2006.01)
*G09G 3/32* (2016.01)

(52) U.S. Cl.
CPC ............. *G09G 3/3648* (2013.01); *G09G 3/32* (2013.01); *G09G 2310/0289* (2013.01); *G09G 2330/021* (2013.01)

(58) Field of Classification Search
None
See application file for complete search history.

(56) References Cited

U.S. PATENT DOCUMENTS 9,007,291 B2 * 4/2015 Lee ...................... G09G 3/3655 377/67
2005/0242837 A1 * 11/2005 Shin ............... H03K 19/018571 326/81
2009/0027100 A1 * 1/2009 Choi .................... G09G 3/3677 345/55
2009/0073148 A1 * 3/2009 Hsueh .............. H03K 19/01714 345/204

(Continued)

FOREIGN PATENT DOCUMENTS

WO 2022109447 5/2022
WO WO-2024151721 A1 7/2024

OTHER PUBLICATIONS

"International Application Serial No. PCT/US2024/011030, International Search Report mailed Apr. 2, 2024", 4 pgs.

(Continued)

*Primary Examiner* — Sepehr Azari
(74) *Attorney, Agent, or Firm* — Schwegman Lundberg & Woessner, P.A.

(57) ABSTRACT

A pixel level-shifter for driving a pixel of a display has a reduced power consumption and a reduced size. The pixel level-shifter includes an internal reference voltage generator that receives an external reference voltage signal and generates an internal reference voltage signal based on the external reference voltage signal. A level-shifting circuit receives a low voltage pixel output signal and generates a boosted drive signal based on the low voltage pixel output signal and the internal reference voltage signal. A first (Continued)

transistor circuit is coupled between a high voltage pixel supply voltage node and a pixel electrode node and includes a control node coupled to receive the boosted drive voltage signal. The first transistor circuit controls application of a high voltage pixel supply voltage signal on the pixel electrode node in response to the boosted drive signal.

11 Claims, 6 Drawing Sheets

(56) References Cited

U.S. PATENT DOCUMENTS

2017/0163257 A1* 6/2017 Levy .................... H03K 17/567

OTHER PUBLICATIONS

"International Application Serial No. PCT/US2024/011030, Written Opinion mailed Apr. 2, 2024", 10 pgs.

"International Application Serial No. PCT/US2024/011030, International Preliminary Report on Patentability mailed Jul. 24, 2025", 12 pgs.

* cited by examiner

CONTENTIONLESS LEVEL-SHIFTER FOR DRIVING PIXELS OF A DISPLAY

CLAIM OF PRIORITY

This patent application claims the benefit of priority to U.S. Provisional Patent Application No. 63/479,318, filed Jan. 10, 2023, entitled "CONTENTIONLESS LEVEL-SHIFTER FOR DRIVING PIXELS OF A DISPLAY", which is incorporated by reference herein in its entirety.

TECHNICAL FIELD

The present disclosure relates generally to electronic displays such as liquid crystal-on-silicon (LCoS) and light-emitting diode (LED) displays, and more particularly to pixel level-shifters having reduced size and power consumption for driving pixels of such displays.

BACKGROUND

Typical Augmented Reality (AR) headsets include devices that fit onto the face or around the head of a person. In order to generate an AR image, the headsets have to accommodate many components, such as two displays, optical components (e.g., an optical engine), and power supplies. Consequently, current AR headsets may be bulky and may also have a short battery life due to the power consumed by all required components. In AR, virtual reality (VR), and Head-Mounted headsets, and other head-wearable apparatuses, LCoS or microLED displays are commonly utilized, and these displays, along with the other components in the headset, must be powered by a battery contained in the headset. The volume, weight, and battery life of the displays utilized in such headsets are of importance in making the headsets as comfortable as possible and capable of being worn for long periods before requiring the battery be recharged. Circuits for driving pixels of the displays contained in head-wearable apparatuses may consume a relatively large amount of power, and may also occupy a relatively large area as the size of the pixels or "micropixels" in such displays has continually been reduced. Accordingly, there is a need for improved circuits for driving pixels of displays contained in head-wearable apparatuses.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
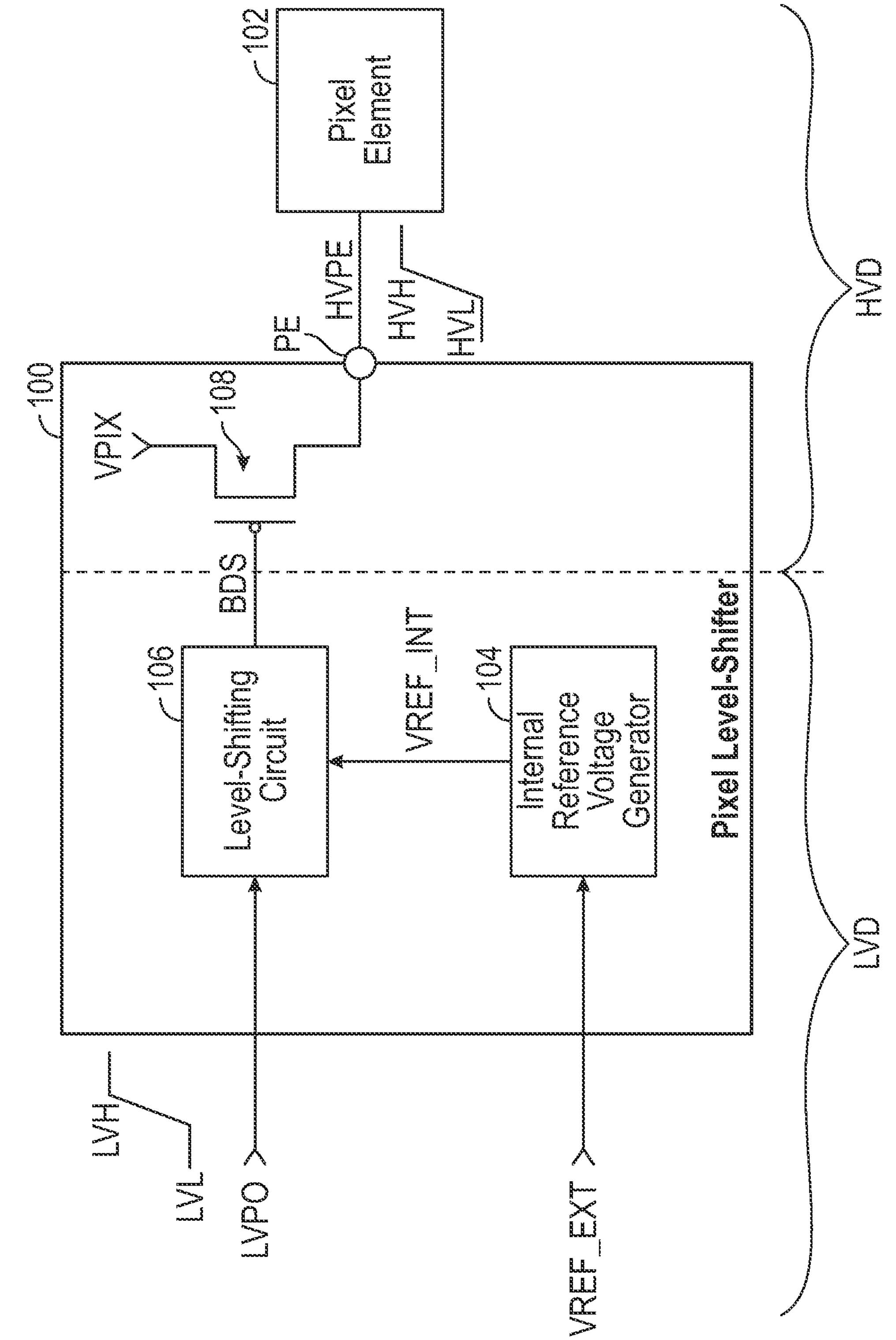
FIG. 1 is a functional block diagram of a pixel level-shifter for driving a pixel of a display in accordance with some embodiments of the present disclosure.

Displays having a minimized power and area are key design goals for utilization in battery-powered devices like head-wearable apparatuses such as AR and VR headsets. These displays, which may be referred to as "microdisplays" due to the small size of pixels in the displays, include LCoS and LED types of displays. The displays typically include a silicon backplane in which electronic circuitry associated with each pixel is formed and also include a frontplane in which pixel elements are formed. The structure of each pixel element depends on the type of the display. For example, in an LCOS display each pixel element includes a liquid crystal material between two electrodes, while in an LED display each pixel element includes one or more LEDs. While the scaling of dimensions and operating voltages of components contained in the backplane, which are typically formed through modern semiconductor processes, have steadily decreased, the dimensions and operating voltages of the pixel elements contained in the frontplane have failed to keep pace. As a result, each pixel in a display is a mixed voltage circuit, with components in the backplane operating at lower voltages and thus being contained in a low voltage domain while pixel elements of the frontplane operate at higher voltages and are accordingly contained in a high voltage domain.

As will be understood by those skilled in the art, an electronic display may be considered as including two basic parts: a frontplane and a backplane. The frontplane includes components of the display that generate or operate on light provided from the display as images for viewing by a user. For example, where the display is an LED display, the front plane includes LEDs for each pixel element of the display and these LEDs are controlled to provide light and form images for viewing. Where the display is an LCOS display, the frontplane includes for each pixel element a liquid crystal material between two electrodes, with this liquid crystal material being controlled to provide transmitted or reflected light from the display to form the images for viewing. The backplane of a display includes electronic components to control the operation of the pixel elements in the frontplane. These electronic components in the backplane include components for receiving and processing image data, and generating data to control each pixel element. Each pixel of the display is a mixed voltage circuit as mentioned above. A pixel includes electronic components formed in the backplane operating in a low voltage domain of the pixel. The pixel also includes electronic components coupled to the pixel element in the frontplane, with these electronic components coupled to the pixel element and the pixel element itself operating in a high voltage domain of the pixel.

The mixed voltage nature of each pixel necessitates a pixel level-shifter be utilized to translate or "level-shift" signals in the low voltage domain of the backplane into suitable signals in the high voltage domain of the frontplane. For example, where the components in the backplane are complementary metal oxide semiconductor (CMOS) components, these components may operate with a power supply voltage of 0.8 volts so that an operating voltage range for signals in this low voltage domain is between 0 volts and 0.8 volts. At the same time, where the display is an LCOS display, each pixel element in the frontplane may require an operating voltage range of 0-4 volts to properly drive the liquid crystal material of the pixel element. Conventional pixel level-shifters required to translate signals between the low voltage domain of the backplane and the high voltage domain of the frontplane consume relatively large amounts of power. In addition, these conventional pixel level-shifters also may occupy a relatively large area in each pixel due, at least in part, to the need to include high-voltage components capable of withstanding the higher voltages required for application to the pixel element in the high-voltage domain of the frontplane.

Pixel level-shifters having a small size or occupying a small area, having a reduced power consumption, and allowing for simplified operation of the associated display are needed. A display has a pixel level-shifter to drive the pixel element of each pixel of the display. Each pixel level-shifter receives a low voltage pixel output signal in the low voltage domain of the backplane, with the low voltage pixel output signal having a state or level corresponding to a state or level to which a pixel electrode node of the pixel element is to be driven by the pixel level-shifter. In some embodiments of the present disclosure, each pixel level-shifter includes an internal reference voltage generator that receives an external reference voltage signal and generates a corresponding internal reference voltage signal that is based on the external reference voltage signal. The external reference voltage is supplied to all the level-shifters of the display, and has an approximately constant value in some embodiments of the present disclosure. The external bias voltage is supplied to each pixel level-shifter to enable proper control of high voltage components in the pixel level-shifter that must operate in the high voltage domain of the frontplane. In conventional level-shifters, the value of the external bias voltage is not constant but typically has two different levels or values during operation of the pixel level-shifter to ensure proper operation and reduce power consumption. The need to properly control these dual levels along with the timing of the external bias voltage increases the overall complexity of display driver circuitry including such conventional pixel level-shifters. Pixel level-shifters according to some embodiments of the present disclosure eliminate this need for a dual level external reference voltage signal.

Pixel level-shifters according to some embodiments of the present disclosure further include a level-shifting circuit receiving the low voltage pixel output signal and generating a boosted drive signal based on the low voltage pixel output signal and the internal reference voltage signal. The boosted drive signal has a voltage that is higher than voltages of the low voltage domain of the backplane. The boosted drive signal is utilized to control operation of high voltage components in the pixel level-shifter that must operate on signals having the higher voltages of the high voltage domain of the frontplane. This allows these higher voltage components of the pixel level-shifter to be better controlled to reduce power consumption and improve operation of the pixel level-shifter. An example of such high voltage component in the pixel level-shifter is a first transistor circuit coupled between a pixel supply voltage node and the pixel electrode node. This first transistor circuit includes a control node coupled to receive the boosted drive voltage signal. In response to the boosted drive signal, the first transistor circuit controls application of a pixel supply voltage on the pixel supply voltage node to the pixel electrode node. When the pixel electrode node is to be driven to low voltage level, the boosted drive signal ensures that the first transistor circuit is sufficiently deactivated or turned OFF to reduce current flow from the pixel supply voltage through the first transistor circuit to the pixel electrode node. Reducing this unwanted current through the first transistor circuit in this situation lowers the power consumption of the pixel level-shifter, as will be discussed in more detail below.

FIG. 1 is a functional block diagram of a pixel level-shifter 100 for driving a pixel element 102 of a display in accordance with some embodiments of the present disclosure. In the embodiment of FIG. 1, the pixel level-shifter 100 includes an internal reference voltage generator 104 that receives an external reference voltage signal VREF_EXT and generates an internal reference voltage signal VREF_INT based on the external reference voltage signal. In this way, the level-shifter 100 utilizes a separate internal reference voltage signal VREF_INT in driving the pixel element 102 of a display (not shown in FIG. 1). A level-shifting circuit 106 of the pixel level-shifter 100 receives a low voltage pixel output signal LVPO and generates a boosted drive signal BDS based on the low voltage pixel output signal and the internal reference voltage signal VREF_INT. The low voltage pixel output signal LVPO signal has a state or level corresponding to a state or level to which a pixel electrode node PE of the pixel element 102 is to be driven by the pixel level-shifter 100. The LVPO is a signal in a low voltage domain LVD of a backplane of a display including the level-shifter 100. This low voltage domain LVD is labeled in FIG. 1 and is further represented for the LVPO signal through a signal diagram for the LVPO signal showing a low voltage level LVL and a high voltage level LVH.

The boosted drive signal BDS generated by the level-shifting circuit 106 has a voltage that is greater than a maximum voltage supplied to components in the low voltage domain LVD of the backplane. The boosted drive signal is utilized to control operation of high voltage components in the pixel level-shifter 100 that must operate on signals having the higher voltages of the high voltage domain HVD of the frontplane. In the embodiment of FIG. 1, a field effect transistor (FET) 108 has a control node or gate that is coupled to receive the BDS signal from the level-shifting circuit 106. The FET 108 has signal nodes coupled between a supply voltage node receiving a pixel supply voltage VPIX and the pixel electrode node PE of the pixel element 102. The FET 108 is a P-type FET in the example embodiment of FIG. 1 and accordingly the source signal node is coupled to receive the pixel supply voltage VPIX and the drain signal node is coupled to the pixel electrode node PE.

In response to the level-shifting circuit 106 driving the BDS signal to a low voltage, the FET 108 is activated or turned ON to generate a high voltage pixel electrode signal HVPE on the pixel electrode node PE of the pixel element 102. The HVPE signal is a signal in the high voltage domain HVD of a frontplane of the display including the level-shifter 100. The high voltage domain HVD is labeled in FIG. 1 and is further represented for the HVPE signal through a signal diagram for the HVPE signal showing a low voltage level HVL and a high voltage level HVH for this signal. The BDS signal is also a signal in the high voltage domain HVD since a maximum voltage for this signal is greater than a maximum voltage in the low voltage domain LVD. When the level-shifting circuit 106 drives the BDS signal to a high voltage, the FET 108 is deactivated or turned OFF to isolate the pixel electrode node PE from the pixel supply voltage VPIX so that the pixel electrode node may be driven to a low voltage through suitable circuitry (not shown in FIG. 1) in the pixel level-shifter 100.

The pixel level-shifter 100 and pixel level-shifters according to other embodiments of the present disclosure control a pixel element 102 of a display in a digital manner, meaning the HVPE signal applied to the pixel electrode node PE of the pixel element 102 is driven to either the low voltage level HVL or the high voltage level HVH in high voltage domain HVD. In the present description, driving the HVPE signal to the low voltage level HVL or high voltage level HVH in the high voltage domain HVD may be described as simply driving the HVPE signal low or high, respectively. Similarly, the LVPO signal in the low voltage domain LVD is a digital signal having either the low voltage level LVL or high voltage level LVH. Once again, in the present description, driving the LVPO signal at the low voltage level LVL or high voltage level LVH in the low voltage domain LVD may be described as simply driving the LVPO signal low or high, respectively.

In operation, the internal reference voltage generator 104 generates the internal reference voltage signal VREF_INT from the external reference voltage signal VREF_EXT and supplies this internal reference voltage signal to the level-shifting circuit 106 for utilization in generating the boosted drive signal BDS to control operation of the FET 108. External circuitry (not shown) in the low-voltage domain LVD of the backplane supplies the low-voltage pixel output signal LVPO to the pixel level-shifter 100, with the LVPO signal having either the low-voltage level LVL or high-voltage level LVH to cause the pixel level-shifter to drive the HVPE signal to the desired high-voltage level HDH or low-voltage level HGL in the high-voltage domain HVD of the frontplane. When the external circuitry provides the LVPO signal at the high-voltage level LVH, the level-shifting circuit 106 generates the BDS signal in the high voltage domain HVD having a voltage level that is sufficiently high to turn OFF the FET 108 so that other circuitry (not shown) in the pixel level-shifter 100 can drive the HVPE signal on the pixel electrode node PE to the low-voltage level HVL. Conversely, when the external circuitry provides the LVPO signal at the low-voltage level LVL, the level-shifting circuit 106 generates the BDS signal having a voltage level that is sufficiently low to turn ON the FET 108 and thereby drive the HVPE signal on the pixel electrode node PE to the high-voltage level HVH, which is approximately equal to the pixel supply voltage VPIX.

Figure 2:
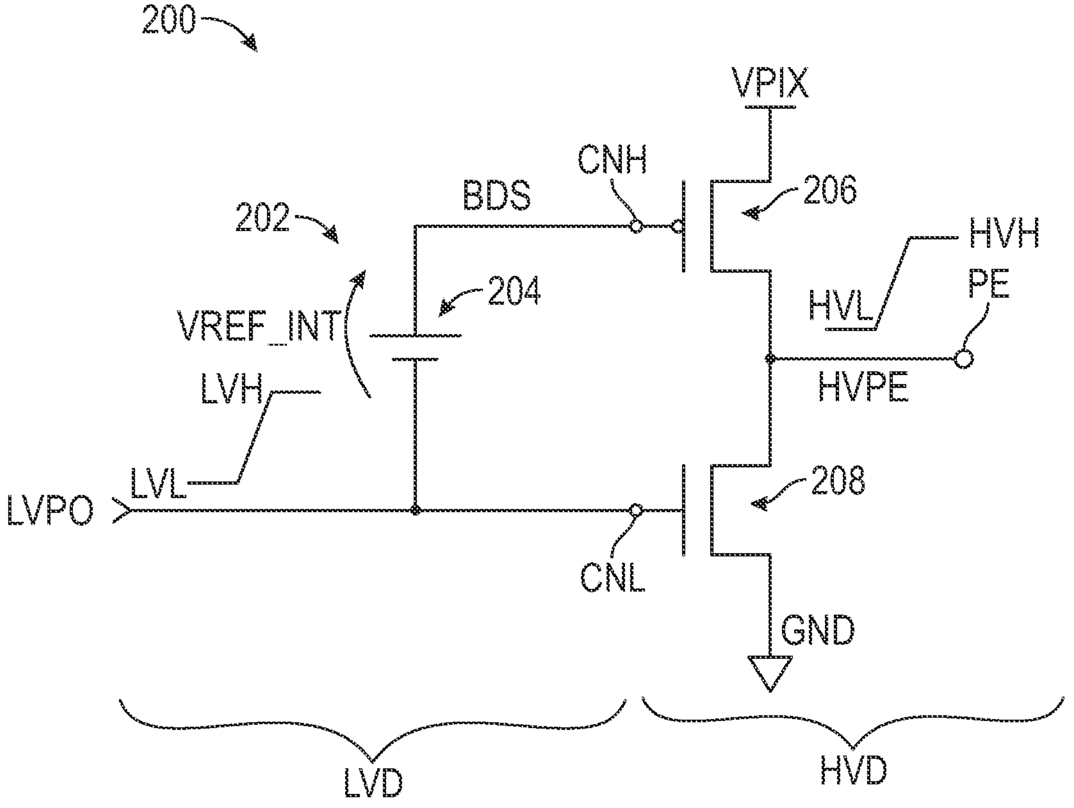
FIG. 2 is a more detailed schematic of a pixel level-shifter of FIG. 1 in accordance with some embodiments of the present disclosure.

FIG. 2 is a more detailed schematic of a pixel level-shifter 200 in accordance with some embodiments of the present disclosure. The pixel level-shifter 200 corresponds to one embodiment of the pixel level-shifter 100 of FIG. 1 and includes a level-shifting circuit 202 formed by an energy storing element 204 coupled between a low control node CNL and a high control node CNH. The energy storing element 204 is a battery providing an internal reference voltage VREF_INT in the embodiment of FIG. 2. In response to a low voltage pixel electrode signal LVPE, the energy storing element 204 generates a boosted drive signal BDS on the high control node CNL to control operation of an FET 206. The FET 206 is one of a pair of FETs 206, 208 coupled in series between a pixel supply voltage node that receives a pixel supply voltage VPIX and a reference voltage node that receives a ground voltage GND. A control node of the FET 206 is coupled to the high control node CNH and a control node of the FET 208 is coupled the low control node CNL. The FET 206 is a P-type FET and the FET 208 an N-type FET in the embodiment of FIG. 2. A high voltage pixel electrode signal HVPE is generated on a pixel electrode node PE formed at the interconnection of the series-connected FETs 206, 208, with the pixel electrode node adapted to be coupled to a pixel element (not shown) being driven by the pixel level-shifter 200.

In operation, the LVPO signal is received on the low control node CNL to cause the pixel level-shifter 200 to drive the HVPE signal to the desired high voltage level HVL or low voltage level LVL in the high voltage domain HVD of a pixel element coupled to the pixel electrode PE. The LVPO signal is in the low voltage domain LVD of the pixel level-shifter 200 and has either a low voltage level LVL and a high voltage level LVH. When the LVPO signal is low (i.e., at the low voltage level LVL in the low voltage domain LVD), the FET 208 is turned OFF and the BDS signal on the high control node CNL has a low voltage of (LVL+VREF_INT). The internal reference voltage VREF_INT has value so that in this situation the voltage of the BDS signal turns ON the FET 206 to drive the HVPE signal to the high voltage level HVH in the high voltage domain HVD. In other words, when the FET 206 is a P-type FET as in the example of FIG. 2, the value of the VREF_INT voltage is selected to apply a negative gate-to-source voltage that is greater than the threshold voltage of the FET 206, which turns ON the transistor to drive the HVPE signal high. When the LVPO signal is high (i.e., at the high voltage level LVH in the low voltage domain LVD), the FET 208 is turned ON and the BDS signal on the high control node CNL has a high voltage of (LVH+VREF_INT). This high voltage of the BDS signal is sufficiently close the pixel supply voltage VPIX to turn OFF the FET 206. Thus, when the LVPO signal is high the HVPE signal is driven low through the turned ON FET 208 to the low voltage level HVL in the high voltage domain HVD.

The pixel level-shifter 200 utilizes the internal reference voltage VREF_INT provided by the energy storing element 204 in a bootstrap manner to generate the BDS signal to control operation of the P-type FET 206 operating in the high voltage domain HVD. The VREF_INT voltage is bootstrapped to the voltage level of the LVPO signal in the low voltage domain LVD to generate the BDS signal in the high voltage domain HVD. This generation of the BDS signal in the high voltage domain HVD improves the operation of the pixel level-shifter 200 and also reduces power consumption of the level-shifter. Bootstrapping the LVPO signal using the VREF_INT voltage ensures that the FET 206 is sufficiently turned OFF when the LVPO signal is high and the FET 208 is turned ON to drive the HVPE signal low. This reduces "contention" or transition current of pixel level-shifter 200 that may otherwise flow through the FETs 206, 208 from the pixel supply voltage VPIX to ground GND during transitioning of the HVPE signal from high-to-low and low-to-high.

The VREF_INT voltage has a value that is large enough to sufficiently turn OFF the FET 206 during high-to-low transitions of the HVPE signal. At the same time, the value of the VREF_INT voltage also ensures that when the LVPO signal goes low the BDS signal has a value that sufficiently turns ON the FET 206 to drive the HVPE signal high within a maximum transition time allowed for proper operation of the display being controlled. Thus, the value of the VREF_INT voltage also ensures the HVPE signal is driven high within the maximum transition time during low-to-high transitions of the HVPE signal. More specifically, the value of the VREF_INT signal has a value that is sufficiently low to turn ON the FET 206 hard enough such that sufficient current is provided from the pixel supply voltage VPIX through the FET 206 to charge the pixel electrode node PE and thereby drive the HVPE signal high within the maximum transition time.

Figure 3:
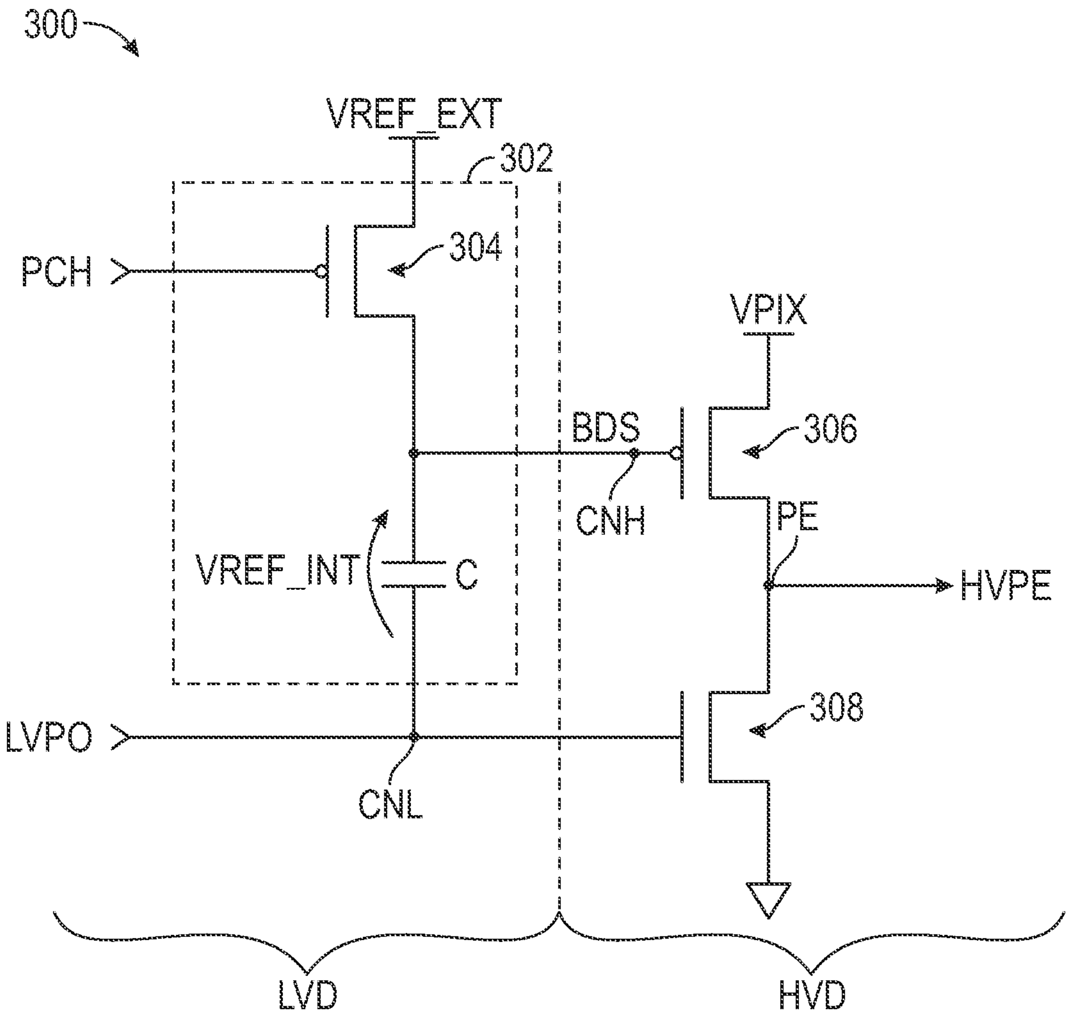
FIG. 3 is a more detailed schematic of a pixel level-shifter in accordance with some embodiments of the present disclosure.

FIG. 3 is a more detailed schematic of a pixel level-shifter 300 in accordance with some embodiments of the present disclosure. The pixel level-shifter 300 corresponds to one embodiment of the pixel level-shifter 100, 200 of FIGS. 1 and 2. In the pixel level-shifter 300, a level-shifting circuit 302 is formed by a capacitive circuit C and a pre-charge transistor 304 coupled in series between a voltage node configured to receive an external reference voltage signal VREF_EXT and a low control node CNL. The capacitive circuit C corresponds to one embodiment of the energy storing element 204 of FIG. 2. A pre-charge signal PCH is applied to a control node of the pre-charge transistor 304 to charge the capacitive circuit C to approximately the external reference voltage VREF_EXT when the PCH signal is activated. A P-type transistor 306 and N-type transistor 308 are coupled in series between a supply voltage node configured to receive a pixel supply voltage VPIX and a reference voltage node configured to receive a reference voltage GND. A control node of the transistor 308 is coupled the low control node CNL to receive a low voltage pixel output signal LVPO in the low voltage domain LVD. The LVPO signal is applied by external circuitry (not shown) to cause the pixel level-shifter 300 to drive the HVPE signal on pixel electrode PE high or low. The transistor 306 is coupled between the pixel electrode PE and the supply voltage node receiving the pixel supply voltage VPIX. A control node of the transistor 306 is coupled to a high control node CNH defined at the interconnection of the pre-charge transistor 304 and capacitive circuit C. The level-shifting circuit 302 operates to generate a boosted drive signal BDS on the high control node CNH to control operation of the transistor 306 in the high voltage domain HVD.

The overall operation of the pixel level-shifter 300 in controlling the HVPE signal in response to the applied LVPO signal will now be described in more detail. In an initial phase of operation of the pixel level-shifter 300, assume the LVPO signal is low, turning OFF the transistor 308. The PCH signal is also initially high, turning OFF the pre-charge transistor 304. At this point, a voltage of the BDS signal is sufficiently less than the pixel supply voltage VPIX to turn ON the transistor 306, and the HVPE signal is driven high through the activated transistor 306.

In preparation for a next phase of operation, the pixel level-shifter 300 next operates in a pre-charge mode during which the capacitive circuit C is pre-charged to approximately the external reference voltage VREF_EXT. This pre-charging of the capacitive circuit C is done while the LVPO signal is still low. Thus, while the LVPO signal is low, the PCH signal is driven low to turn ON the pre-charge transistor 304 and thereby charge the capacitive circuit C to approximately the external reference voltage VREF_EXT. This is true assuming the low level of the LVPO signal is at ground GND (0 volts). The value of the VREF_EXT is selected, as described for the internal reference voltage VREF_INT of FIG. 2, such that even when the capacitive circuit C is fully charged after the pre-charge operation, the voltage of the BDS signal, which corresponds to the voltage of the VREF_EXT at this point since the LVDS signal is low, causes a gate-to-source voltage supplied to the transistor 306 to be greater than the threshold voltage of this transistor. In this way, the transistor 306 is turned ON to drive the HVPE signal high. The LVPO signal is low at this point, turning OFF the transistor 308.

After the pre-charge phase of operation, the LVPO signal may be driven high to cause the pixel level-shifter 300 to operate in a transition phase of operation and drive the HVPE signal low. In response to the LVPO signal going high, the BDS signal is bootstrapped to a sufficiently high voltage to turn OFF the transistor 306. More specifically, the voltage of the BDS signal (VBDS) is driven to the high voltage level LVH of the LVPO signal plus the internal reference voltage VREF_INT across the capacitive circuit C (i.e., VBDS=VREF_INT+LVH). Thus, when the LVPO signal goes high, the BDS signal is bootstrapped to a sufficiently high voltage to turn OFF the transistor 306 that was previously driving the HVPE signal high. The high LVPO signal also turns ON the transistor 308 to drive the HVPE signal low.

In operation of the pixel level-shifter 300, there may be some leakage current through the capacitive circuit C that reduces the magnitude of the internal reference voltage VREF_INT over time. Thus, the magnitude of the VREF_INT voltage may be slightly lower between the time the capacitive circuit C is initially pre-charged and the time the internal reference voltage across the capacitive circuit is bootstrapped to generate the BDS signal. The capacitive circuit C is accordingly formed to ensure the magnitude of the internal reference voltage VREF_INT is sufficiently maintained for utilization in generating the bootstrapped BDS signal notwithstanding the leakage current through the capacitive circuit.

In contrast to some conventional pixel level-shifters, the pixel level-shifter 300 does not require the external reference voltage VREF_EXT have a dual values. This simplifies array drive circuitry (not shown) that must generate and control the timing of such a dual level external reference voltage. The elimination of the need for a dual level external reference voltage also reduces power consumption through the elimination of shoot-through current that flows in conventional pixel level-shifters for pixels having a low signal on the pixel electrode. More specifically, the pixel level-shifter 300 has a reduced power consumption through the utilization of the bootstrapped BDS signal to control the turning OFF of the transistor 306 when the HVPE signal is being driven low.

Conventional pixel level-shifters may also include a P-type transistor and N-type transistor coupled in series to drive the pixel electrode node of a pixel element. In such conventional pixel level-shifters, an external reference voltage is applied to the control nodes of the P-type transistors and has a value that allows the P-type transistor to drive the signal on the pixel electrode node high within a required transition time. In this conventional approach, the N-type transistor must be sized to drive the signal on the pixel electrode node low even though the P-type transistor continues to supply current to the pixel electrode node in this situation. In this type of conventional pixel level-shifter, the power dissipation is high in this situation due to the shoot-through current flowing from the pixel supply voltage through the P-type transistor and N-type transistor to ground. This shoot-through current or "contention" is avoided, or greatly reduced, in the pixel level-shifter 300 through the utilization of the internal reference voltage VREF_INT to bootstrap the BDS signal sufficiently high to turn OFF the P-type transistor 306 when the HVPE signal on the pixel electrode PE is being driven low.

In further embodiments of the pixel level-shifter 300, the transistors 304, 306, 308 may be different conductivity type FET transistors. For example, in another embodiment of the pixel level-shifter 300, the pre-charge transistor 304 is an N-type FET transistor instead of a P-type FET transistor as in the illustrated embodiment of FIG. 3. In such an embodiment, the level of the activated pre-charge signal PCH would be inverted compared to the embodiment of FIG. 3. Thus, the PCH signal would be driven active high to turn ON the N-type pre-charge transistor 304 and pre-charge the capacitive circuit C to approximately the external reference voltage VREF_EXT. Conversely, the PCH signal would be driven inactive low to turn OFF the N-type pre-charge transistor 304 in this embodiment.

In the pixel level-shifters 100, 200 and 300 of FIGS. 1-3, each of the components in the low voltage domain LVD and high voltage domain HVD must be able to withstand operating voltages applied to these components in that domain. Components in the low voltage domain, for example, which typically operate with voltages in the range of 0.8 to 1.2 volts. Components in the high voltage domain HVD must, of course be capable of withstanding the higher voltages defining this domain. Components in the high voltage domain HVD will typically operate with voltages in the range of 2-4 volts. Furthermore, the specific structure and type of components forming the pixel level-shifters 100, 200 and 300 may vary in different embodiments of the present disclosure. For example, although the transistors contained in each of the pixel level-shifters 100, 200 and 300 are shown as being formed by single FET transistors, each of these transistors may be formed by a transistor circuit including multiple transistors. Each such transistor circuit may include transistors of both N-type and P-type FETs, and the pixel level-shifters 100, 200 and 300 may also include transistors of a type other than a FET, such as bipolar junction transistors or thin-film transistors in further embodiments of the present disclosure. Thus, further embodiments of the pixel level-shifter 200 of FIG. 2 may include a first transistor circuit having one or more transistors in place of the FET 206 and a second transistor circuit having one or more transistors in place of the FET 208. Similarly, further embodiments of the pixel-level shifter 300 of FIG. 3 may include a first transistor circuit having one or more transistors in place of the FET 306, a second transistor circuit having one or more transistors in place of the FET 304, and a third transistor circuit having one or more transistors in place of the FET 308.

Similarly, although the capacitive circuit C is shown as being formed by a single capacitor, the capacitive circuit is formed by multiple capacitors in further embodiments of the present disclosure. The energy storing element 204, which is the capacitive circuit C in the embodiment of FIG. 4, may also be formed by components other than capacitive circuits in further embodiments of the present disclosure. In pixel level-shifters according to some embodiments of the present disclosure the capacitive circuit C is one of a metal-insulator-metal (MIM) capacitor, a metal-oxide-metal (MOM) capacitor, or a metal-oxide-semiconductor (MOS) capacitor.

Figure 4:
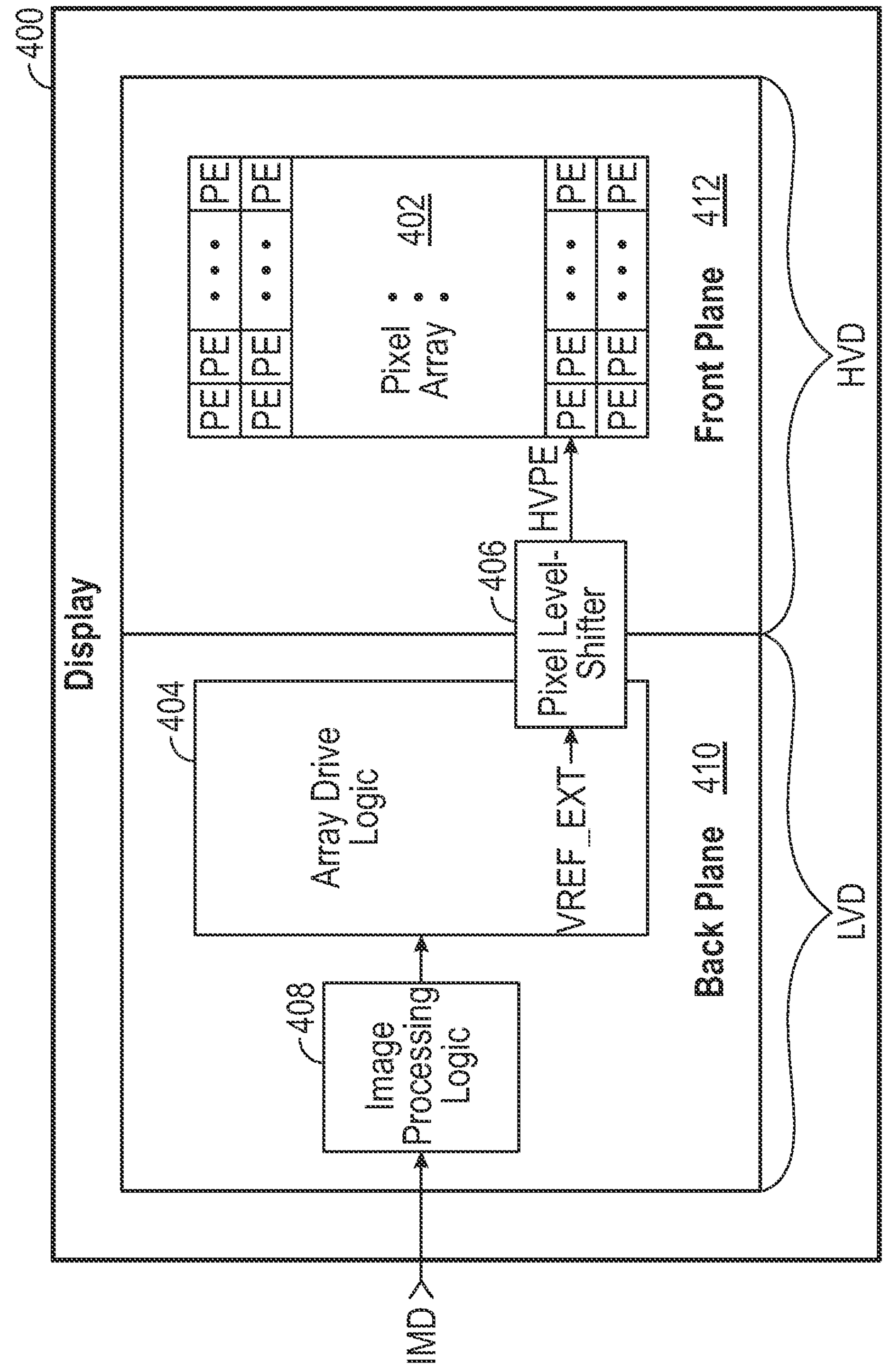
FIG. 4 is a diagram illustrating a display including a pixel array and array driver logic including pixel level-shifters of any of FIGS. 1-3 for driving each of the of pixels of the pixel array in accordance with some embodiments of the present disclosure.

FIG. 4 is a diagram illustrating a display 400 including a pixel array 402 and array driver logic 404 including a pixel level-shifter 406 for driving pixel elements PE of pixels in the pixel array in accordance with some embodiments of the present disclosure. The pixel level-shifter 406 corresponds to any one of the pixel level-shifters 100, 200, 300 of FIGS. 1-3 according to some embodiments of the display 400. The pixel array 402 includes a plurality of pixel elements PE arranged in rows and columns. Each of the pixel elements PE is driven by a corresponding pixel level-shifter 406. Only one pixel level-shifter 406 providing a high voltage pixel electrode signal HVPE signal to drive one of the pixel elements PE of the pixel array 402 is shown in FIG. 4 to simplify the diagram. The array driver logic 404 actually includes a plurality of pixel level-shifters 406, one pixel level-shifter for driving each of the pixel elements PE in the pixel array 402. The array driver logic 404 also provides the external reference voltage VREF_EXT to all pixel level-shifters 406 in some embodiments of the present disclosure.

In the display 400, the array driver logic 404 along with image processing logic 408 are formed in a backplane 410 of the display. The image processing logic 408 receives image data IMD and processes this data to generate data and command signals that are supplied to the array driver logic 404. In response to these data and command signals from the image processing logic 408, the array driver logic 404 generates signals, including the low voltage pixel output signal LVPO supplied to each of the pixel level-shifters 406, to control the level of the high voltage pixel electrode signal HVPE applied to each pixel element PE. The pixel elements PE of the pixel array 402 are formed in a frontplane 412 of the display. The structure of the pixel elements PE will depend on the type of the display 400. For example, the pixel elements PE will be a liquid crystal material where the display 400 is an LCOS display or LEDs where the display is an LED display. The backplane 410 along with the array driver logic 404 and image processing logic 408 contained therein operate in a low voltage domain LVD of the display 400 while the pixel elements PE of the pixel array 402 operate in a high voltage domain HVD of the display.

As described above in relation the pixel level-shifters 100, 200, 300 of FIGS. 1-3, a pixel level-shifter according to embodiments of the present disclosure is a mixed voltage circuit, including some components that operate in the low voltage domain LVD and some components that operate in the high voltage domain HVD. As a result, the one illustrated pixel level-shifter 406 in the display 400 is shown in being contained in both the low voltage domain LVD and high voltage domain HVD. Each pixel of the display 400 includes corresponding circuitry contained in the array driver logic 404 of the backplane 410, including the components of the corresponding pixel level-shifter 406, as well the corresponding pixel element PE in the frontplane 412.

Figure 5:
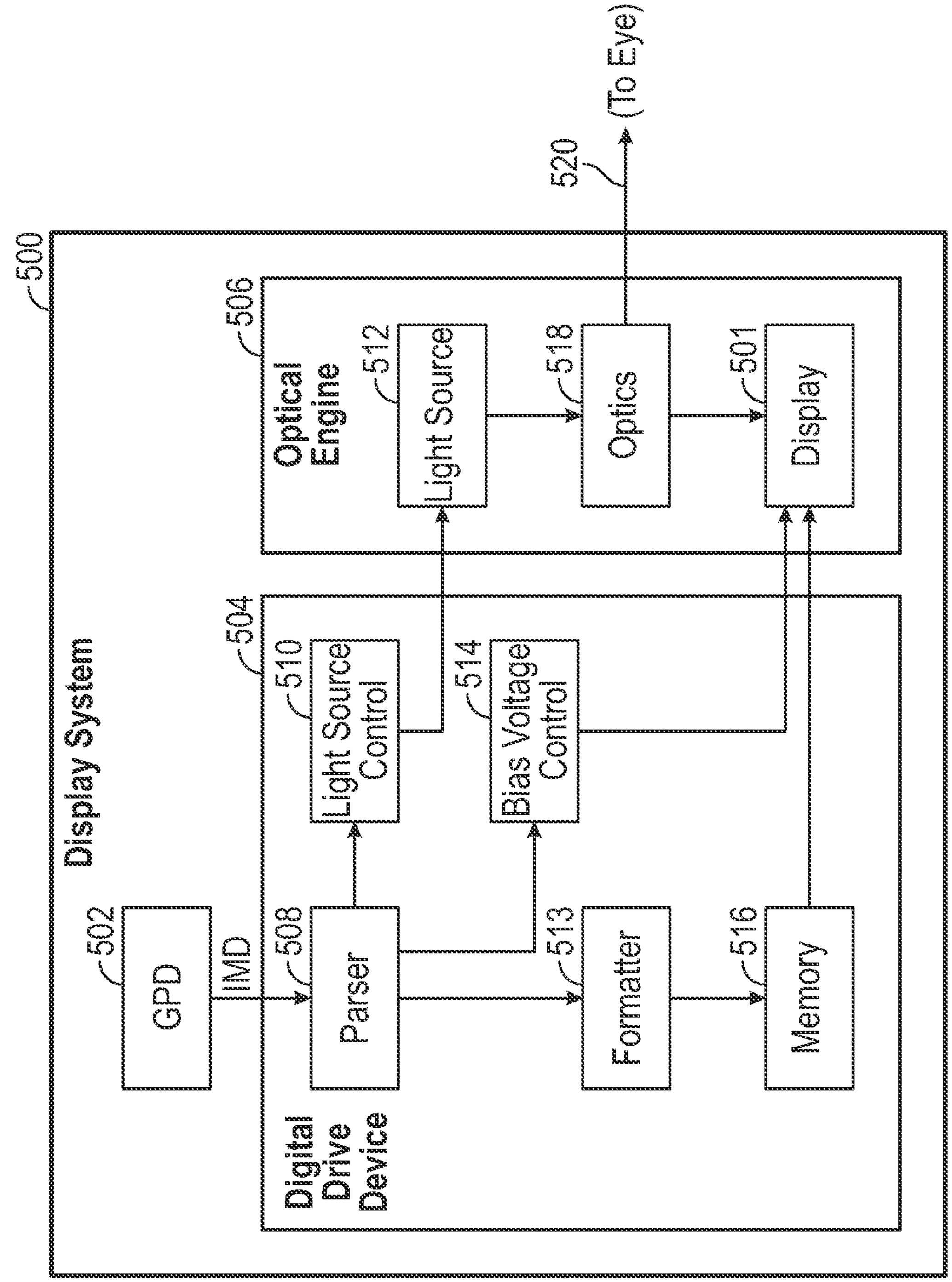
FIG. 5 is a functional block diagram of display system including the display of FIG. 4 in accordance with some embodiments the present disclosure.

FIG. 5 is a functional block diagram of display system 500 including a display 501 in accordance with some embodiments the present disclosure. The display 501 corresponds to the display 400 of FIG. 4 in some embodiments of the present disclosure. The display system 500 includes a graphics processing device (GPD) 502 electrically coupled to provide image data IMD to a digital drive device 504 that stores and processes the image data to generate data and command signals to control operation of an optical engine 506 in generating an image for viewing by a user or viewer (not shown) of the display system. The display system 500 may be a component of a computing system, a head-wearable apparatus such as an AR or VR headset, or other type of electronic device in which the display 501 may be a spatial light modulator (SLM) such as an LCOS display, or an LED display such as a microLED display. The LED display may also be an organic LED (OLED) display in embodiments of the present disclosure.

The image data IMD provided by the GPD 502 may include image and control data, and the GPD generally includes a suitable processor that may be internal or external to the GPD. The processor of the GPD 502 executes software modules or programs stored in a memory of the GPD, where the memory also may be internal or external to the GPD.

In the embodiment of FIG. 5, the digital drive device 504 receives image data IMD from the GPD 502 and parses the received data via a parser 508 contained in the digital drive device. The parser 508 separates image and command data, and routes information associated with the parsed image and command data to a light source control component 510 that controls a light source 512 in the optical engine 506 to control generation of light by the light source. The digital drive device 504 includes the light source control component 510, and the optical engine 506 includes the light source 512 when the display 501 is an LCOS display. In response to command data from the parser 508, the light source control component 510 converts the received command data into timed control signals for controlling the light source 512.

Command data from the parser 508 is also supplied to a bias voltage control component 514, which converts received command data into a bias voltage for utilization in the display 501. The bias voltage generated by the bias voltage control component corresponds to the external reference voltage VREF_EXT applied to the pixel level-shifters 100-300 of FIGS. 1-3 in embodiments of the present disclosure. A formatter 513 receives parsed image data from the parser 508 and converts this received image data into binary formatted data, such as bit-plane data, for utilization in driving the state of each of the pixels of the display 501. The "state" of each of the pixel of the display 501 corresponds to the level of the HVPE signal applied to the pixel element PE of the pixel, as discussed above with reference to FIGS. 1-4. The binary formatted data, such as bit-plane data, from the formatter 513 is stored in a memory 516, which may also store control data for controlling the display 501. The binary formatted data in memory 516 and bias voltage from the bias voltage control component 514 form data and command signals supplied by the digital drive device 504 to the display 501.

Although shown as being part of the optical engine 506, the display 501 may be external to the optical engine 506 in some embodiments of the present disclosure. Where the display 501 is an LCOS display, the optical engine 506 includes the light source 512 for illuminating the display with non-image bearing light under control of the light source control component 510. The light source control component 510 controls, for example, the intensity as well as the turning ON and OFF of the light source 512. The optical engine 506 further includes optics 518, which may include beam splitters, polarizers, polarizing beam splitters, lenses, and waveguides, and which functions to route light from the light source 512 to the SLM (e.g., LCoS display 501) and to then direct reflected or transmitted light 520 from the SLM towards an eye of a viewer. The digital drive device 504 and optical engine 506 may include additional components, or may omit some of the illustrated components 508-518 such as components 510 and 514, in other embodiments of the present disclosure, with the specific components depending on the type of the display system 500 being implemented.

Figure 6:
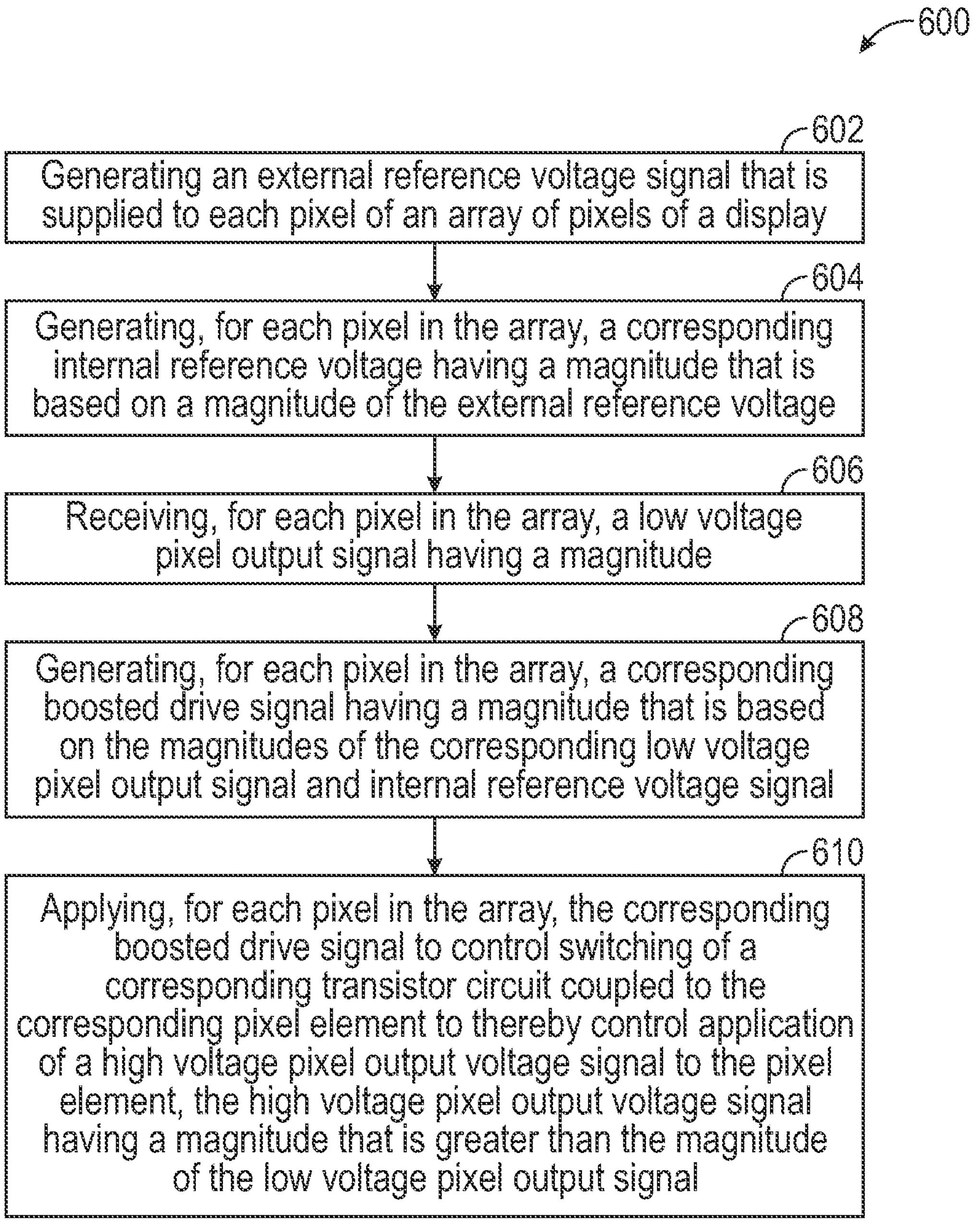
FIG. 6 is a flowchart of a process of controlling switching of a pixel in a display in accordance with some embodiments of the present disclosure.

FIG. 6 is a flowchart of a method or process 600 of controlling switching of a pixel in a display in accordance with some embodiments of the present disclosure. The process 600 begins at 602 and generates an external reference voltage signal VREF_EXT that is supplied to each pixel of an array of pixels of a display. From 602, the process 600 proceeds to 604, and for each pixel in the array a corresponding internal reference voltage signal is generated having a magnitude that is based on a magnitude of the external reference voltage. After 604, the process 600 proceeds to 606 and a low voltage pixel output signal having a magnitude is received for each pixel in the array. From 606, the process 600 goes to 608 and, for each pixel in the array, a corresponding boosted drive signal is generated having a magnitude that is based on the magnitudes of the corresponding low voltage pixel output signal and internal reference voltage signal. The process 600 goes from 608 to 610 and applies, for each pixel in the array, the corresponding boosted drive signal to control switching of a corresponding transistor circuit coupled to a corresponding pixel element to thereby control application of a high voltage pixel output voltage signal to the pixel element, the high voltage pixel output voltage signal having a magnitude that is greater than the magnitude of the low voltage pixel output signal.

In some embodiments of the process 600, generating, for each pixel in the array, the corresponding internal reference voltage signal includes pre-charging, for each pixel in the array, a corresponding capacitive circuit using the external reference voltage signal. Furthermore, in some embodiments of the process 600, generating, for each pixel in the array, the corresponding boosted drive signal comprises coupling the corresponding pre-charged capacitive circuit between a first node configured to receive the low voltage pixel output signal and a second node on which the boosted drive signal is generated. Finally, in some embodiments of the process 600 the external reference voltage signal has a single or constant magnitude during operation of the display.

Reference has been made in this document in detail to specific example embodiments for carrying out the inventive subject matter of the present disclosure. Examples of these specific embodiments are illustrated in the accompanying drawings, and specific details are set forth in the description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the present disclosure.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. The present disclosure is intended to cover any and all adaptations or variations of the above embodiments. Combinations of the above embodiments, or components of such embodiments, and other embodiments not specifically described herein, will be apparent, to those of skill in the art, upon reviewing the above description. The accompanying drawings form a part of the detailed description of the present disclosure. The drawings show, by way of illustration, specific embodiments that can be practiced. These embodiments may also have been referred to above as "examples," and such embodiments or examples can include elements in addition to those shown or described. The present disclosure also contemplates embodiments in which only those elements shown or described are included.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A display comprising:

a silicon backplane comprising a low voltage domain, the low voltage domain comprising processing circuitry;

a frontplane comprising a high voltage domain, the high voltage domain comprising a plurality of pixel elements; and a plurality of display pixels, each display pixel comprising:

a pixel element of the plurality of pixel elements;

a level-shifting circuit configured to receive a low voltage pixel output signal from the processing circuitry in the low voltage domain and to generate a boosted drive signal based on the low voltage pixel output signal and an internal reference voltage signal; and a first transistor circuit coupled between a pixel supply voltage node and a high voltage pixel electrode node of the display pixel element in the high voltage domain, the first transistor circuit including a control node coupled to receive the boosted drive signal, the first transistor circuit configured, in response to the boosted drive signal, to control application of a pixel supply voltage signal on the pixel supply voltage node to the high voltage pixel electrode node;

wherein the level-shifting circuit comprises:

a capacitive circuit coupled between a low control node configured to receive the low voltage pixel output signal and a high control node coupled to the control node of the first transistor circuit; and a second transistor circuit coupled between the high control node and an external reference voltage node, the second transistor circuit including a control node configured to receive a pre-charge signal, the pre-charge signal turning on the second transistor circuit to pre-charge the capacitive circuit to a magnitude of an external reference voltage signal at the external reference voltage node, wherein the magnitude of the external reference voltage signal is selected such that a gate-to-source voltage supplied to the first transistor circuit is greater than a threshold voltage of the first transistor circuit.

2. The display of claim 1, wherein the level-shifting circuit is configured, after the pre-charge signal has been activated to pre-charge the capacitive circuit, to generate the boosted drive signal in response to the low voltage pixel output signal going high, the boosted drive signal having a magnitude that is equal to the magnitude of the external reference voltage signal plus a magnitude of the low voltage pixel output signal.

3. The display of claim 2 further comprising a third transistor circuit coupled between the pixel electrode node and a reference voltage node, the third transistor circuit including a control node coupled to the low voltage control node to receive the low voltage pixel output signal.

4. The display of claim 3, wherein each of the first and second transistor circuits comprises a P-type field effect transistor and the third transistor circuit comprises an N-type field effect transistor.

5. The display of claim 1, wherein the external reference voltage signal has a single magnitude during operation of the pixel level-shifter.

6. A display system, comprising:

a digital drive device in a low voltage domain of the display system, the digital drive device configured to receive image data and to process the image data to generate corresponding data and command signals;

an optical engine configured to receive light from a plurality of pixel elements of a pixel array and to direct the light towards an eye of a viewer; and a display coupled to the digital drive device to receive data and command signals for controlling operation of the display, the display including:

a frontplane comprising a high voltage domain of the display system, the high voltage domain comprising the plurality of pixel elements; and a silicon backplane comprising array drive logic coupled to the pixel array, the array drive logic including, for each pixel element in the plurality of pixel elements, a pixel level-shifter configured to shift signals from the low voltage domain to the high voltage domain for driving the pixel element, the pixel level-shifter comprising:

a level-shifting circuit configured to receive a low voltage pixel output signal from the digital drive device and to generate a boosted drive signal based on the low voltage pixel output signal and an internal reference voltage signal; and a first transistor circuit coupled between a high voltage pixel supply voltage node and a pixel electrode node of a corresponding one of the plurality of pixels, the first transistor circuit including a control node coupled to receive the boosted drive voltage signal and configured to control application of a high voltage pixel supply voltage signal on the pixel electrode node in response to the boosted drive signal;

wherein the level-shifting circuit is formed by a capacitive circuit coupled between a low voltage control node configured to receive the low voltage pixel output signal and a high voltage control node coupled to the control node of the transistor circuit, wherein the level-shifting circuit further comprises a pre-charge transistor coupled between a node configured to receive an external reference voltage signal and the high voltage control node, the pre-charge transistor including a control node configured to receive a pre-charge signal, the pre-charge signal turning on the pre-charge transistor to pre-charge the capacitive circuit to a magnitude of the external reference voltage signal, wherein the magnitude of the external reference voltage is selected such that a gate-to-source voltage supplied to the first transistor circuit is greater than a threshold voltage of the first transistor circuit.

7. The display system of claim 6, wherein the display comprises one of a light-emitting diode display or a spatial light modulator.

8. The display system of claim 7, wherein the spatial light modulator comprises a liquid crystal-on-silicon (LCoS) display, and wherein the optical engine further comprises a light source for illuminating the LCOS display.

9. A method, comprising:

generating an external reference voltage signal in a backplane of a display, the external reference voltage signal supplied to respective pixels of an array of pixels of a display;

receiving a pre-charge signal at a pre-charge transistor of a transistor circuit of a plurality of transistor circuits, each transistor circuit corresponding to an individual pixel in the array and coupled to a pixel element of the individual pixel, the pixel element being in a frontplane of the display;

generating, in response to receiving the pre-charge signal, a corresponding internal reference voltage by pre-charging a capacitive circuit to a magnitude that is based on a magnitude of the external reference voltage and that causes a gate-to-source voltage supplied to the transistor circuit to be greater than a threshold value of the transistor circuit;

receiving, at the individual pixel, a low voltage pixel output signal from a low voltage domain of the display;

generating, for the individual pixel, a boosted drive signal in a high voltage domain of the frontplane of the display, the boosted drive signal having a magnitude that is based on the low voltage pixel output signal and an internal reference voltage signal; and applying the boosted drive signal to control switching of the transistor circuit to thereby control application of a high voltage pixel output voltage signal to the pixel element, the high voltage pixel output voltage signal having a magnitude that is greater than the magnitude of the low voltage pixel output signal.

10. The method of claim 9, wherein generating the boosted drive signal comprises coupling the pre-charged capacitive circuit between a first node configured to receive the low voltage pixel output signal and a second node on which the boosted drive signal is generated.

11. The method of claim 9, wherein the external reference voltage signal has a single magnitude during operation of the display.

* * * * *